UNITED STATES PATENT OFFICE 3,835,042
Patented Sept. 10, 1974

3,835,042
REMOVAL AND RECOVERY OF CHROMIUM FROM POLLUTED WATERS
Jean Marc Lalancette and Bernard Coupal, Sherbrooke, Quebec, Canada, assignors to Universite de Sherbrooke, Sherbrooke, Quebec, Canada
No Drawing. Continuation-in-part of abandoned application Ser. No. 269,862, July 7, 1972. This application Sept. 26, 1973, Ser. No. 400,832
Int. Cl. C02c 5/02
U.S. Cl. 210—28      5 Claims

ABSTRACT OF THE DISCLOSURE

Chromium polluted solutions are treated by a process which avoids the necessity of reducing chromium VI to chromium III. The process involves forming a chromium sulfide complex by adding a water-soluble ferric salt to the chromium polluted solution and insolubilizing the complex formed by treatment with a compound which when dissolved in water forms sulfide ions and separating the insoluble precipitate by filtration through a bed of peat moss. The peat moss containing the insoluble chromium iron sulfide complex is oxidized under heat to recover the chromium as chromium oxide. If other metals such as cadmium, copper, lead, mercury, iron and zinc are present in the polluted solution they will also be recovered in the form of their oxides except the mercury which will be recovered as such by pyrolysis of the flue gases.

---

The present invention relates to a process for separating the chromium ions contained in chromium-polluted solutions, and contained particularly in electroplating baths and to a process for recovering the chromium in the form of its oxide.

This application is a continuation-in-part of U.S. application Ser. No. 269,862, filed July 7, 1972 now abandoned.

PRIOR ART

With the industrial development of plating and bright dipping there has been an increase in the use of chromium as a surface coating for metals with the result that chromium polluted solutions represent a major liquid waste disposal problem. Among the main disadvantages of industrial chromium polluted solutions there may be mentioned that by discharging these in sewers or open streams, a great degree of pollution will result and there will also be an irrecoverable loss of chromium which is important in this era of conservation. It should also be appreciated that most industrial chromium polluted solutions also contain smaller amounts of other metal contaminants such as copper, nickel, zinc, iron in the form of sulfate and cyanides.

One method suggested for the removal of chromium from polluted waters comprises first reducing the chromium VI to chromium III by the use of an appropriate reducing agent such as sodium sulfide, barium sulfide or scrap iron, and then precipitating the chromium III by raising the pH of the solution with lime, for example, whereby the trivalent chromium is precipitated along with the ferric or ferrous salts formed during the reduction. This method is described in Ind. & Eng. Chem., Vol. 33, 1941, pp. 131–134 and in U.S. Pat. 3,716,485, Feb. 13, 1973, R. G. Robertson, inventor. This series of reactions can be illustrated as follows:

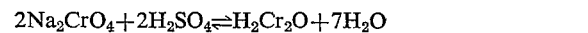

$2Na_2CrO_4 + 2H_2SO_4 \rightleftharpoons H_2Cr_2O + 7H_2O$
$\qquad + 2Na_2SO_4 \rightleftharpoons 2H_2CrO_4 + 2Na_2SO_4$
$6NaHSO_3 + 3H_2SO_4 + 4H_2CrO_4 \rightleftharpoons 2Cr_2(SO_4)_3$
$\qquad + 3Na_2SO_4 + 10H_2O$
$Cr_2(SO_4)_3 + 6NaOH \rightleftharpoons 2Cr(OH)_3 + 3Na_2SO_4$ It should be appreciated that chromium hydroxide is a material which is not easily filtered so that the above described process is not readily adapted to a continuous process.

THE INVENTION

In accordance with the present invention there is now provided a novel process for removing chromium ions from chromium polluted solutions which avoids the necessity of reducing the chromium VI to chromium III. The novel process involves the forming of a complex salt of chromium iron sulfide by adding a water-soluble ferric salt to the chromium polluted solution and insolubilizing the complex formed by treatment with a compound which when dissolved in water forms sulfide ions and separating the insoluble chromium iron sulfide precipitate thus obtained by filtration through a bed of peat moss. In a second aspect of the present invention, the peat moss containing the insoluble chromium iron sulfide complex is oxidized under heat to recover the chromium as the chromium oxide.

More specifically, the invention comprises adding a water-soluble ferric salt to a solution containing a chromium salt, and treating the thus obtained solution with a precipitating agent such as sodium sulfide thereby to form an insoluble complex sulfide salt of chromium and iron while allowing the solution to filter through a bed of peat moss. The filtered water contains less than 0.01 p.p.m. of chromium ion and after aeration or treatment with ozone, the treated water is suitable for industrial or home consumption. The process of the present invention has been found effective to treat chromium containing solutions and particularly those solutions derived from electroplating baths which usually have a concentration of chromium ions which sometimes can go as high as 9000 p.p.m. The method is effective also whether the chromium is in the form of chromium III or chromium VI, but when the chromium in solution is in the form of chromium VI it need not be converted to chromium III in order to form the insoluble precipitate. In fact at least a portion of the chromium is in the hexavalent form.

The reaction involved in the formation of the chromium iron sulfide complex may be illustrated as follows:

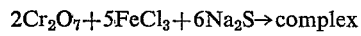

$2Cr_2O_7 + 5FeCl_3 + 6Na_2S \rightarrow complex$

It can be seen that 5/6 of the sulfur is involved in the formation of FeS and the remaining sulfur (1 mole) is far from sufficient to reduce two moles of $Cr_2O_7$.

In practice, a chromium-containing water is circulated in a settling tank at low velocity whereby any metallic compounds and sludge present therein are readily removed. There is then added to the settling tank between 0.1 mg. to 1.0 mg. of a water soluble ferric salt such as for example the nitrate, the sulfate or the chloride per liter per p.p.m. of chromium present. For example, where one litre or solution contains 4000 p.p.m. of chromium 1 gram of ferric chloride is required.

The precipitation of the chromium ions can then be carried out by causing the chromium-contaminated water containing the ferric salt and precipitating agent to flow through a bed of peat at the same time, or adding the ferric salt and the precipitating agent to the chromium-contaminated water and causing the combined solution to flow through a bed of peat. In all cases the chromium and iron will combine with the precipitating agent to form an insoluble chromium-iron complex sulfide which is retained by the peat.

If any other metallic ions such as copper lead, mercury, cadmium, iron or zinc are present in the electroplating bath these will also form insoluble sulfides and will be retained in the peat. These impurities can be present either as individual metallic ions or ions of any two or more of these metals.

As precipitating agent there is used a sulfur-containing compound which when dissolved in water will form sulfide ions. As precipitating agent there may be used hydrogen sulfide, sodium sulfide, ammonium polysulfide or sulhydryl-bearing compounds of the formula R—SH wherein R is alkyl or phenyl, for example hexanthiol. The concentration of the precipitating agent is such that there is a slight excess of the amount required to precipitate the chromium ion contaminant.

As a filtering agent there is used untreated peat in any of the forms naturally available, commercially available or artificially dried. The advantage of peat is that it is fibrous and it has a polar surface or active sites, thereby making it suitable for great adsorption than most filtering aids and further, peat has a very large adsorption surface in ratio to its weight. It also appears that because of the reactive sites which are found in peat, the latter would appear to react as a chelating agent thus causing a reaction between peat and the chromium iron sulfide complex. A great advantage of using peat is that it is a readily available material at very low cost and further the precipitated complex of chromium iron sulfide can be recovered in the form of its oxide by oxidation, thereby avoiding the displacement of solution as is done with other filtering aids such as activated charcoal from which the contaminant may not usually be recovered. When mercury ions are present in the chromium polluted solutions, oxidation of the chromium-iron sulfide complex containing peat will provide the mercury in the metallic state.

In practice it has been found that the pH of the chromium-contaminated water can vary from 3 to 12, with a pH of about 5 being preferred but when the pH is outside of this range the pH of the solution can be adjusted by acidification with an acid such as hydrochloric acid or alkalinization with an alkaline metal hydroxide such as lime or sodium hydroxide.

With regard to the peat, the amount used is preferably in a ratio of at least 15 to 1 in weight of precipitating agent, this ratio being preferred because it voids any adverse effect of the sodium sulfide or other precipitating agent used on the structure of peat moss. In fact low ratios of peat to precipitating solution will cause disintegration of the peat structure, thus voiding its adsorption action. Also, when using this ratio, the peat moss will easily retain from 5 to 7% of its weight of chromium ions.

Another important factor is that the speed of flow of the chromium contaminated water and the sodium sulfide solution must necessarily be adjusted to provide sufficient time for diffusion of the solution through the peat. Obviously the adjustment will take into consideration the surface and volume of the filtering system.

Having now described the separation of the chromium ions from waste waters of electroplating solutions and its adsorption on the peat, there will now be described the process of recoving the chromium ions from the peat, which process is also a feature of the present invention. The peat containing the chromium sulfide and other metallic sulfides is first removed from the filtering apparatus, compressed and dried to bring the moisture content down to 50–60%. It is then transferred to a furnace and burnt at the lower portion of the furnace at a temperature of 400–500° C. and the flue gases are pyrolyzed. The residue will be chromium oxide or a mixture of metallic oxide corresponding to the initial metallic ions present in the peat. The invention will be more particularly understood by referring to the following Examples which are given to illustrate rather than limit the scope of the invention.

Example 1

1000 gallons of a solution obtained from an electroplating plant and containing mainly chromic salts (8,900 p.p.m.) with traces of copper (40 p.p.m.), lead (5.0 p.p.m.), mercury (30 p.p.m.), cadmium (6.0 p.p.m.), iron (21.5 p.p.m.), zinc (0.5 p.p.m.) was treated by twenty-six pounds of $FeCl_3 \cdot 6H_2O$. There is then added 40 pounds of sodium sulfide and the solution passed over a column of peat. Upon this treatment, the chromium was not detectable by the barium tests (limit of the test: 0.01 p.p.m.). The concentration of all the other metals was below 0.05 p.p.m.

Example 2

By proceeding in the same manner as in Example 1 except that the electroplating solution after the addition of the ferric chloride was circulated through a column of peat containing sodium sulfide, the solution was then found to be chromium free. The chromium content of the effluent was less than 0.01 p.p.m. While other metals were found to have been eliminated and their concentration was less than 0.05 p.p.m.

Example 3

After partially drying the peat obtained from Examples 1 and 2 so as to bring its moisture content to below 70%, the solution was burned at 400° C. using 0.1 cc. of air per gram of peat per minute. The effluent gases obtained in Example 1 were heated at 600° C. for approximately 30 seconds before leaving the furnace to yield mercury upon condensation. The cooled residue was identified as chromium oxide and a mixture of copper oxide, lead oxide, cadmium oxide, iron oxide and zinc oxide.

We claim:

1. A process for removing chromium ions from a chromium-polluted solution which comprises adding a water-soluble ferric salt to chromium polluted water and diffusing through untreated peat moss the resulting solution and a sulfur-containing precipitating agent which when dissolved in water forms sulfide ions, the ratio of peat moss to precipitating agent being at least 15 to 1, whereby an insoluble chromium-iron sulfide complex is formed and is adsorbed on the peat moss and the chromium and iron free water is recovered.

2. The process of Claim 1, wherein the chromium-polluted solution is diffused through peat moss which has been previously impregnated with a sodium sulfide solution.

3. The process according to Claim 1 wherein the chromium-polluted solution and sodium sulfide solution are combined before diffusing the mixture through the peat moss.

4. The process of Claim 1 wherein the chromium-polluted solution also contains at least one ion selected from cadmium, copper, lead, iron and zinc and the peat moss containing the chromium iron sulfide complex is partly dried, subjected to oxidation in a furnace to recover chromium oxide and other metallic oxides.

5. The process of Claim 1 wherein the chromium-polluted solution also contains mercury ions and the peat moss containing the iron sulfide complex is partly dried, subjected to oxidation in a furnace to recover chromium oxide and the flue gases are pyrolyzed to recover the mercury.

References Cited

UNITED STATES PATENTS

| 3,790,370 | 2/1974 | Lalancette | 210—42 X |
| 3,428,551 | 2/1969 | Dawc | 210—502 X |
| 3,716,485 | 2/1973 | Robertson | 210—50 |

OTHER REFERENCES

Hoover et al., "Disposal of Waste Liquors from Chromium Plating," *Ind. & Eng. Chem.*, Vol. 33, January 1941, pp. 131–134.

THOMAS G. WYSE, Primary Examiner

U.S. Cl. X.R.

210—45, 53